UNITED STATES PATENT OFFICE.

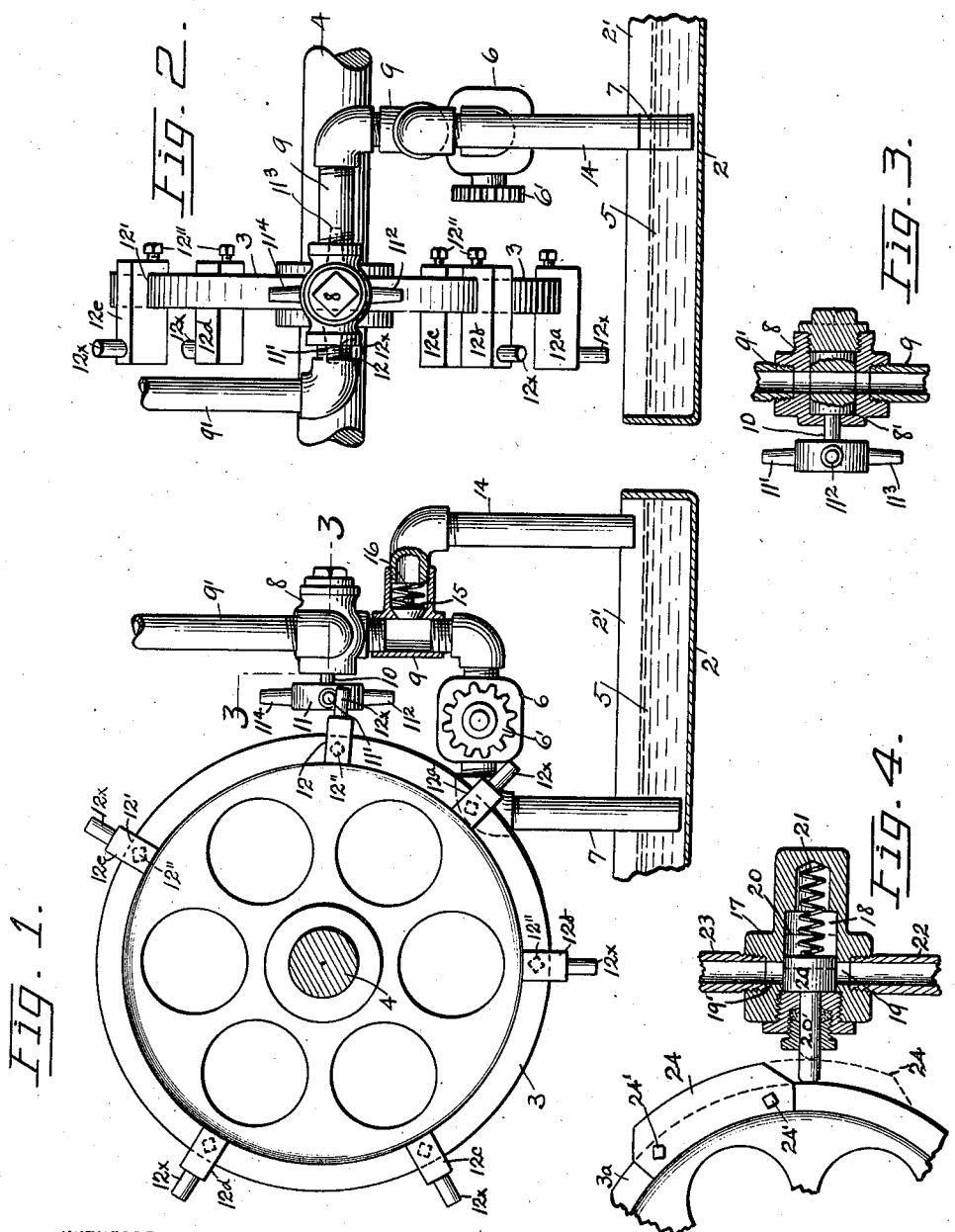

WILLIAM N. MULLIGAN, OF WATERTOWN, NEW YORK.

AUTOMATIC CUTTING-FLUID REGULATOR.

1,290,640.   Specification of Letters Patent.   Patented Jan. 7, 1919.

Application filed February 18, 1918. Serial No. 217,810.

*To all whom it may concern:*

Be it known that I, WILLIAM N. MULLIGAN, a citizen of the United States, residing at Watertown, in the county of Jefferson and State of New York, have invented certain new and useful Improvements in Automatic Cutting-Fluid Regulators, of which the following is a specification.

This invention relates to an automatic control or regulator for cutting-fluids, such as are employed in connection with the operation of certain manufacturing machinery, of which for example, the Potter & Johnson automatic machines are one type.

As a rule, the machines of the class referred to are equipped with means for supplying the various tools with what is known as "cutting-fluid", which is usually pumped from a suitable reservoir and is delivered to the points where the cutting or boring is done. In most cases, no provision is made for automatically turning on or shutting off the fluid, but depend upon the operators, by the aid of some hand-controlled valves, to do this work.

The object of the present invention is to provide an automatic regulator, which is controlled and operated by a moving or driven member of the machine, and which is arranged to automatically turn on the cutting-fluid at the beginning of each cutting operation, and then at the end of such operations, to shut off the fluid until the machine is made ready for the next operation. This not only saves the time and attention of the operators, but also prevents considerable waste or loss of the fluid and the consequent spattering and mussing-up of the machinery and the attendants. A further object is to provide novel and simple adjusting means for predetermining the intervals during which the cutting-fluid may be supplied to the tools, as well as for controlling the supply of said fluid to a number of different tools which operate in sequence.

I attain these objects by the means set forth in the detailed description which follows, and as illustrated by the accompanying drawing, in which—

Figure 1 is a side elevation of my automatic regulator, together with parts of a machine to which it is applied.

Fig. 2 is an end view of the same.

Fig. 3 is a detail-section of the valve which controls the flow of the cutting-fluid.

Fig. 4 is a broken view of a modified form of the device.

In the drawing, 2 represents a portion of the frame or body of a manufacturing machine. 3 is a moving or operating member thereof, which is mounted upon and driven by a shaft 4. For the purpose of describing my invention, the base 2 of the machine is shown to comprise a reservoir 2' containing oil or other fluid 5, which is used for cooling or otherwise protecting the cutting or boring tools (not shown) of the machine. 6 represents a pump of conventional form, such as is used for lifting the fluid 5 from the reservoir and then forcing said fluid through suitable conduits, to the point or points where the cutting or boring is being done. 7 represents a pipe for conducting the fluid from the reservoir 2' to the pump 6. 8 represents a valve disposed between sections 9—9' of another pipe, which extends and carries the fluid from the pump to the turret or other part (not shown) of the machine which supports the tools. The valve comprises the usual rotary plug 8', which is operative in a suitable casing, the said plug having a stem 10, on the outer end of which is mounted a star-wheel 11, having four or more points or arms as $11^1$, $11^2$, $11^3$, and $11^4$. The pump 6 may be operated by means of a gear 6'. The valve-plug 8' has a bore which extends diametrically through the plug, and when the valve is open said bore or port alines with the openings in the pipes 9—9'. The star-wheel 11 is intended to be operated one-quarter of a turn at a time, which first opens then closes, then opens and finally closes the passage for the fluid 5, during each revolution of the wheel or handle 11. The wheel 11 is operated by a plurality of dogs or clips as 12, $12^a$, $12^b$, $12^c$, &c., which are mounted in spaced relation upon the rim of the wheel 3. Each dog 12 is provided with a slot or gain 12' which receives the rim of the wheel 3, and a set-screw 12" secures each dog to said wheel. In Fig. 1, the dog 12 is positioned so that its striker $12^x$, which extends a considerable distance beyond the body of the dog is engaging point 11¹ of the star-wheel, and is in the act of rotating said wheel 11 a quarter turn, for opening the valve 8, for allowing the pump 6 to deliver a quantity of the fluid 5, to a certain tool which is about to begin its operation. It will be understood that the member or wheel 3 is more or less constantly in motion during the operation of the machine, so that while a boring or other tool is performing its work, the wheel 3 moves relatively to the travel of the tool. By this arrangement, after the dog 12 opens the valve 8, said valve remains open for supplying the fluid 5 to the tool, during the interval of the boring operation. Meanwhile the member 3 continues to rotate correspondingly, and by the time the cutting operation is completed, the striker 12ˣ of the second dog 12ᵃ moves forward and engages the arm or point 11² of the star-wheel, and rotates the plug 8′ another quarter turn, which closes the valve and stops the flow of the fluid through the pipe 9′. This completes one boring or cutting operation of the machine, and also one period or interval of the feeding of the cutting-fluid. While the machine is being changed, so as to bring a second tool into position to perform its work, the wheel or member 3 continues to rotate, and by the time the second tool is ready to start its work, another dog, as 12ᵇ engages the third point 11³ of the wheel 11 and again opens the valve for supplying the fluid 5 for the second tool's work. At the end of the second operation, a fourth dog, 12ᶜ, is brought into position to engage and move the point 11⁴ of the wheel 11 for again closing the valve and shutting off the flow of the fluid 5. The work of the third tool of the machine is taken care of by the dogs 12ᵈ and 12ᵉ, and so on, until the whole cycle of operations of the machine is completed. Where one tool has more work to do than another tool, such as boring a deeper hole, the corresponding dogs are disposed a longer distance apart, as best seen at 12ᵈ—12ᵉ in Fig. 1.

When the work of a machine is understood, the intervals of time during which the fluid 5 should be supplied, or shut off, may be readily predetermined, and the dogs 12 positioned accordingly. In this way the fluid may be turned on by one dog at the instant a tool begins its work, and the fluid may also be shut off by the next dog the instant the operation is completed. As a rule, the pumps 6 are operated continuously, and for that reason it is necessary to provide a suitable overflow for the fluid during the intervals the valves 8 are closed. For this purpose, a pipe 14 taps the pipe 9 and carries the fluid back into the reservoir 2′, and a check-valve 15 located in the pipe 14 controls the overflow in the usual manner.

Fig. 4 illustrates a modification of the device, in which 17 represents the body or casing of a plunger valve, having a cavity 18 which is open at one end, and having transverse ports 19—19′ which intersect said cavity. Within the cavity 18 is disposed a plunger valve 20, which is normally held in position to close the ports 19—19′ by a spring 21. A pipe 22 carries the fluid from the reservoir to the valve, and a pipe 23 carries the fluid away from the valve. The valve 20 has a stem 20′ which extends beyond the casing 17, and is disposed in the path of one or more cams 24, which are adjustably mounted on the rim of the driven member 3ᵃ. The cams 24 are arranged to depress the valve 20 at the start of each operation of the tools of a machine (see dotted lines in Fig. 4), and then hold the valve open during the whole of said operation. In practice one cam is employed for each tool carried by the machine, and when the operating intervals vary, the cams are made longer or shorter to correspond. The cams are held in place by set-screws 24′.

My automatic cutting-fluid regulator is extremely simple in construction and positive in action, and may be installed at slight expense.

Having thus described my invention, what I claim, is—

1. In an automatic cutting-fluid regulator, a rotary machine element, a supply of fluid, a conduit for conducting said fluid, a valve disposed in said conduit and having radial arms, and a plurality of dogs successively movable in the path of said arms adapted to open and close said valve at varying predetermined moments.

2. In a cutting-fluid regulator, the combination with a machine having a moving element, and a supply of cutting-fluid, of a conduit for conducting said fluid, a valve in said conduit, and a plurality of dogs arranged in pairs carried by said moving element each pair of dogs adjustable and adapted to open and close said valve at varying predetermined moments.

3. In a fluid regulator, the combination with a driven member of a machine, and a supply of cutting-fluid, of a plurality of dogs adjustably mounted on said member in spaced relation, a conduit for conducting said fluid, and a valve in said conduit having a plug provided with radial arms which are disposed in the path of and adapted to be successively operated by said dogs.

4. In a fluid controller, the combination with a moving member of a machine, and a pump for forcing a cutting-fluid to parts of said machine, of a valve for controlling the flow of said fluid, a star-wheel for operating said valve, and a plurality of dogs adjustably mounted on said member, said dogs traveling in a circle which cuts through the path of the points of said star-wheel adapted to alternately open and close said valve.

5. In a cutting-fluid regulator, the combination with a driven element of a machine, and a pump for forcing the fluid through a conduit, of a rotary valve in said conduit, a star-wheel for operating said valve, and a plurality of dogs arranged in pairs, said dogs adjustably mounted on the driven element and adapted to turn on and turn off said fluid at predetermined moments.

In testimony whereof I affix my signature.

WILLIAM N. MULLIGAN.